(12) United States Patent
Wilcox et al.

(10) Patent No.: US 10,119,662 B2
(45) Date of Patent: Nov. 6, 2018

(54) LENS WITH CONTROLLED LIGHT REFRACTION

(71) Applicant: Cree, Inc., Durham, NC (US)

(72) Inventors: Kurt S. Wilcox, Libertyville, IL (US); Craig Raleigh, Racine, WI (US); Corey Goldstein, Mt. Pleasant, WI (US)

(73) Assignee: Cree, Inc., Durham, NC (US)

( * ) Notice: Subject to any disclaimer, the term of this patent is extended or adjusted under 35 U.S.C. 154(b) by 131 days.

(21) Appl. No.: 15/236,612

(22) Filed: Aug. 15, 2016

(65) Prior Publication Data

US 2016/0348858 A1    Dec. 1, 2016

Related U.S. Application Data

(63) Continuation of application No. 14/625,712, filed on Feb. 19, 2015, now Pat. No. 9,915,409, and a continuation of application No. 14/155,061, filed on Jan. 14, 2014, now Pat. No. 9,416,926, and a continuation-in-part of application No. 13/843,649, filed on Mar. 15, 2013, and a continuation-in-part of application No. 12/431,308, filed on Apr. 28, 2009, now Pat. No. 9,217,854.

(51) Int. Cl.
| | |
|---|---|
| *F21K 9/69* | (2016.01) |
| *F21V 5/04* | (2006.01) |
| *F21V 5/00* | (2018.01) |
| *F21V 7/00* | (2006.01) |
| *G02B 19/00* | (2006.01) |
| *F21Y 115/10* | (2016.01) |
| *G02B 3/00* | (2006.01) |

(52) U.S. Cl.
CPC ............ *F21K 9/69* (2016.08); *F21V 5/007* (2013.01); *F21V 5/04* (2013.01); *F21V 7/0091* (2013.01); *G02B 19/0014* (2013.01); *G02B 19/0061* (2013.01); *F21Y 2115/10* (2016.08); *G02B 2003/0093* (2013.01)

(58) Field of Classification Search
CPC ... F21V 5/04; F21V 5/08; F21V 5/041; F21V 5/042; F21V 5/045; F21V 5/046; F21V 5/048

See application file for complete search history.

(56) References Cited

U.S. PATENT DOCUMENTS

| | | |
|---|---|---|
| 1,004,585 A | 10/1911 | Mulholland et al. |
| 1,024,695 A | 4/1912 | Mulholland |
| 2,212,876 A | 8/1940 | Chauvet |

(Continued)

FOREIGN PATENT DOCUMENTS

| | | |
|---|---|---|
| WO | 2008144672 A1 | 11/2008 |
| WO | 2012/132597 A1 | 10/2012 |

*Primary Examiner* — Robert May
(74) *Attorney, Agent, or Firm* — Jansson Munger McKinley & Kirby Ltd.

(57) ABSTRACT

A lens for distribution of light from a light emitter having an emitter axis. The lens including an outer surface receiving light from the inner surface which defines an inner cavity and includes an axial inner-surface portion of a conical shape formed by a substantially cross-sectionally linear inner region extending outwardly from positions at the emitter axis toward an open end of the inner cavity. An LED light fixture comprising a mounting structure supporting a plurality of spaced LED light sources with a plurality of the lenses each in alignment with a corresponding one of the light sources.

18 Claims, 20 Drawing Sheets

(56) References Cited

U.S. PATENT DOCUMENTS

| | | |
|---|---|---|
| 2,254,961 A | 9/1941 | Harris |
| 2,544,413 A | 3/1951 | Bouwers |
| 4,186,995 A | 2/1980 | Schumacher |
| 4,474,437 A | 10/1984 | Gorenstein |
| 4,537,474 A | 8/1985 | Astern |
| 4,561,736 A | 12/1985 | Furter et al. |
| 4,738,516 A | 4/1988 | Verhoeven et al. |
| 5,302,778 A | 4/1994 | Maurinus |
| 5,494,615 A | 2/1996 | Wang Lee |
| 6,033,087 A | 3/2000 | Shozo et al. |
| 6,273,596 B1 | 8/2001 | Parkyn et al. |
| 6,356,395 B1 | 3/2002 | Tawa et al. |
| 6,395,201 B1 | 5/2002 | Hunt et al. |
| 6,499,870 B1 | 12/2002 | Zwick et al. |
| 6,502,956 B1 | 1/2003 | Wu |
| 6,547,423 B2 | 4/2003 | Marshall et al. |
| 6,598,998 B2 | 7/2003 | West et al. |
| 6,616,299 B2 | 9/2003 | Martineau |
| 6,679,621 B2 | 1/2004 | West et al. |
| 6,837,605 B2 | 1/2005 | Reill |
| 6,896,381 B2 | 5/2005 | Benitez et al. |
| 7,153,000 B2 | 12/2006 | Park et al. |
| 7,153,002 B2 | 12/2006 | Kim et al. |
| 7,181,378 B2 | 2/2007 | Benitez et al. |
| 7,227,703 B2 | 6/2007 | Chen |
| 7,246,931 B2 | 7/2007 | Hseih et al. |
| 7,352,011 B2 | 4/2008 | Smits et al. |
| 7,365,916 B2 | 4/2008 | Sato et al. |
| 7,391,580 B2 | 6/2008 | Maresse |
| 7,411,742 B1 | 8/2008 | Kim et al. |
| 7,422,347 B2 | 9/2008 | Miyairi et al. |
| 7,514,722 B2 | 4/2009 | Kawaguchi et al. |
| 7,549,769 B2 | 6/2009 | Kim et al. |
| 7,722,196 B2 | 5/2010 | Caire et al. |
| 7,766,509 B1 | 8/2010 | Laporte |
| 7,766,530 B2 | 8/2010 | Hwang et al. |
| 7,874,703 B2 | 1/2011 | Shastry et al. |
| 7,922,370 B2 | 4/2011 | Zhang et al. |
| 8,339,716 B2 | 12/2012 | Premysler |
| 8,348,475 B2 | 1/2013 | Wilcox et al. |
| 8,430,538 B2 | 4/2013 | Holder et al. |
| 8,545,049 B2 | 10/2013 | Davis et al. |
| 8,773,616 B2 | 7/2014 | Iiyama et al. |
| 2002/0067549 A1 | 6/2002 | Tawa et al. |
| 2003/0235050 A1 | 12/2003 | West et al. |
| 2004/0246606 A1 | 12/2004 | Benitez et al. |
| 2005/0086032 A1 | 4/2005 | Benitez et al. |
| 2006/0034082 A1 | 2/2006 | Park et al. |
| 2006/0232881 A1 | 10/2006 | Park et al. |
| 2006/0252169 A1 | 11/2006 | Ashida |
| 2007/0058369 A1 | 3/2007 | Parkyn et al. |
| 2007/0070530 A1 | 3/2007 | Seo et al. |
| 2008/0084693 A1 | 4/2008 | Shimada et al. |
| 2008/0089210 A1 | 4/2008 | Saito et al. |
| 2008/0151550 A1 | 6/2008 | Liu et al. |
| 2008/0198604 A1 | 8/2008 | Kim et al. |
| 2008/0203415 A1 | 8/2008 | Thompson et al. |
| 2008/0239722 A1 | 10/2008 | Wilcox |
| 2008/0285136 A1 | 11/2008 | Jacobowitz et al. |
| 2008/0294254 A1 | 11/2008 | Cumming et al. |
| 2008/0297020 A1 | 12/2008 | Wanninger et al. |
| 2008/0298056 A1 | 12/2008 | Petersen |
| 2009/0052192 A1 | 2/2009 | Kokubo et al. |
| 2009/0159915 A1 | 6/2009 | Branchevsky |
| 2010/0039810 A1 | 2/2010 | Holder et al. |
| 2010/0238669 A1 | 9/2010 | Holder et al. |
| 2010/0271708 A1 | 10/2010 | Wilcox |
| 2011/0103051 A1 | 5/2011 | Wilcox et al. |

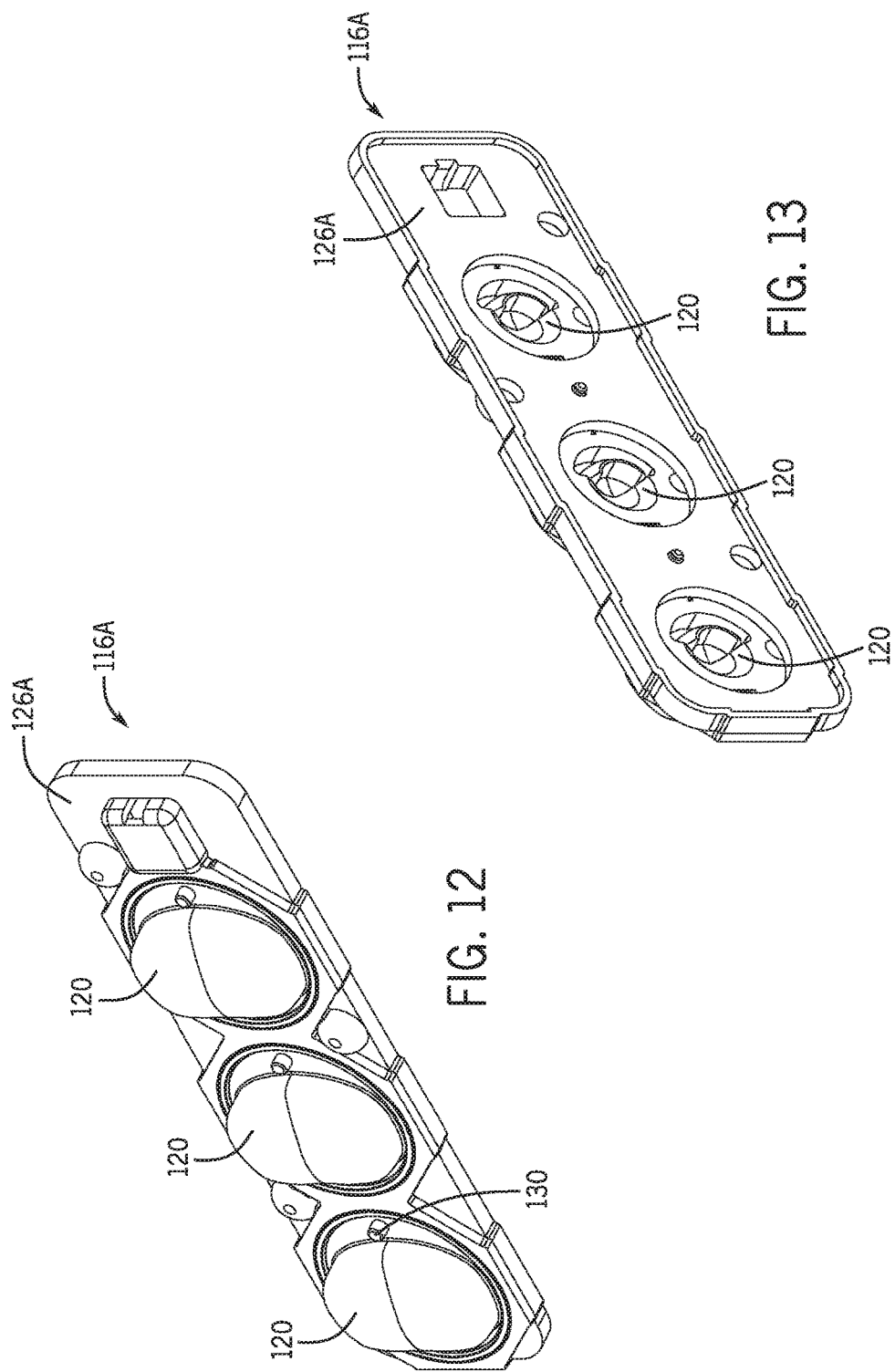

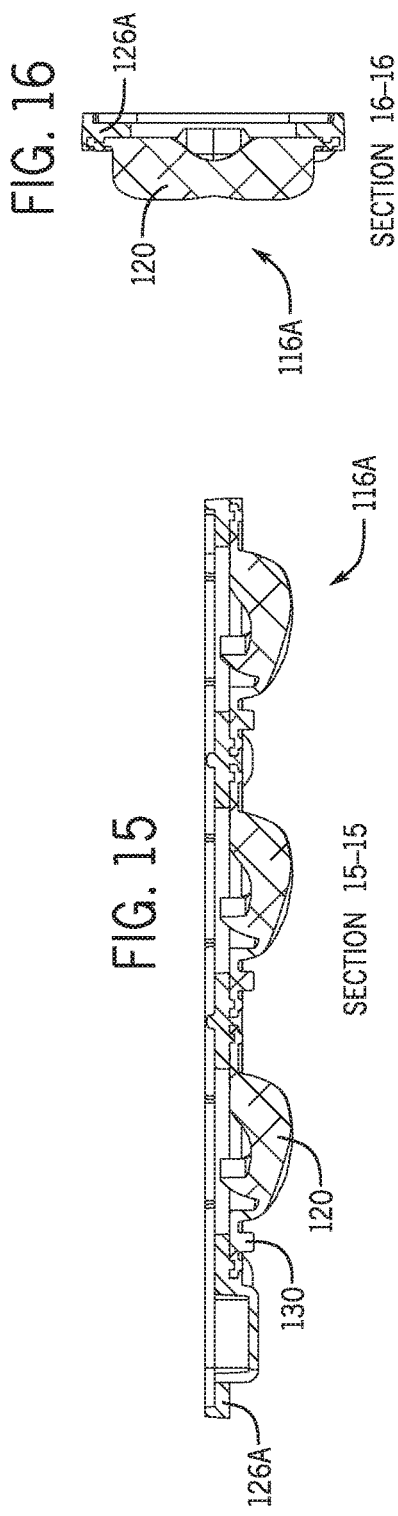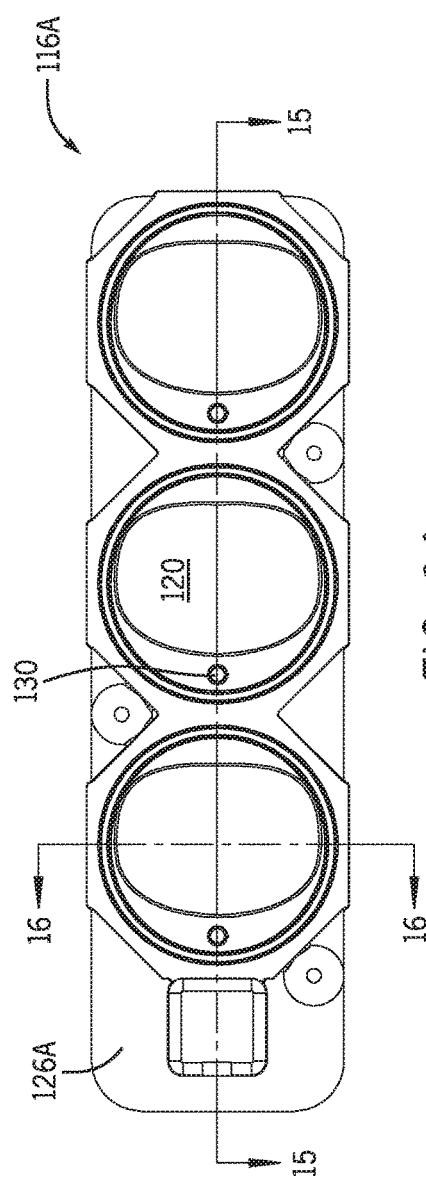

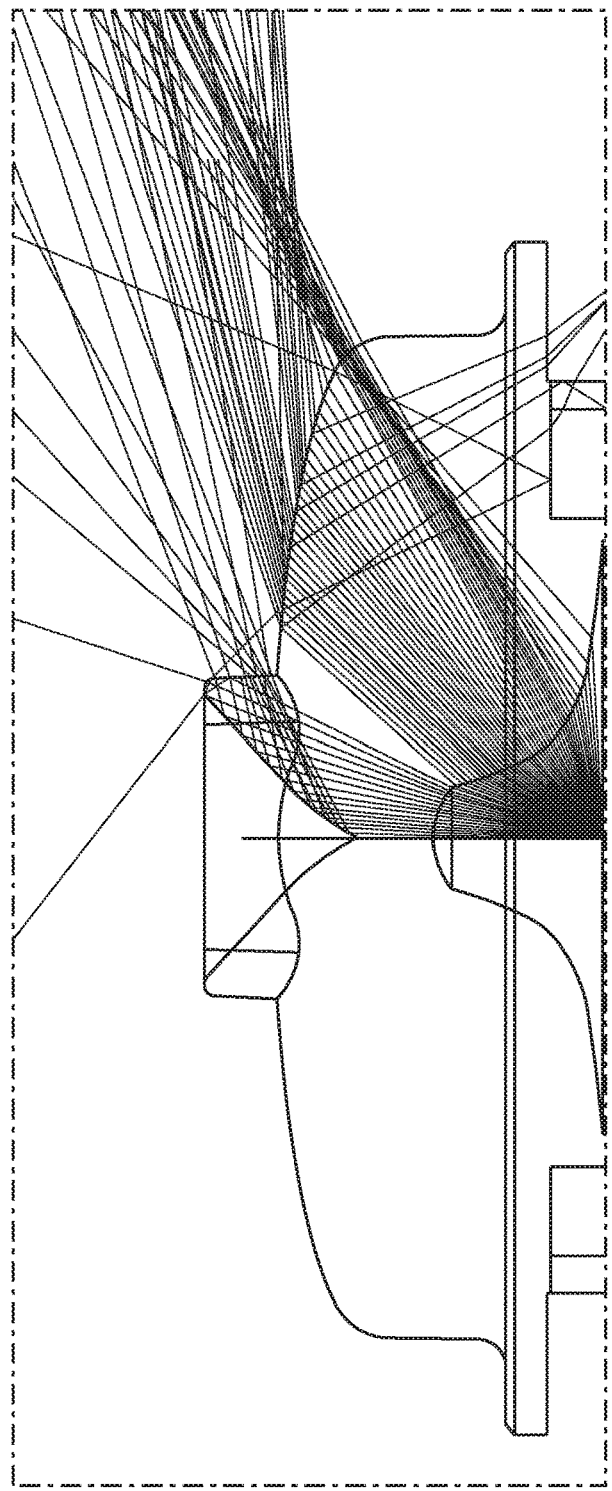

LENS WITH CONTROLLED LIGHT REFRACTION

RELATED APPLICATION

This application is continuation of patent application Ser. No. 14/155,061, filed Jan. 14, 2014, which is a continuation-in-part of patent application Ser. No. 12/431,308, filed Apr. 28, 2009, and Ser. No. 13/843,649, filed Mar. 15, 2013. This application is continuation of patent application Ser. No. 14/625,712, filed Feb. 19, 2015. The entirety of the contents of each of patent application Ser. Nos. 14/155,061, 12/431,308, 13/843,649, 14/625,712 are incorporated herein by reference.

FIELD OF THE INVENTION

This invention relates to lighting fixtures and, more particularly, to optics designed for desired LED light distribution. This invention also relates to the field of LED optics.

BACKGROUND OF THE INVENTION

In recent years, the use of light-emitting diodes (LEDs) for various common lighting purposes has increased, and this trend has accelerated as advances have been made in LEDs and in LED-array bearing devices, often referred to as "LED modules." Indeed, lighting needs which have primarily been served by fixtures using high-intensity discharge (HID) lamps, halogen lamps, compact florescent light (CFL) and other light sources are now increasingly beginning to be served by LEDs. Creative work continues in the field of LED development, and also in the field of effectively utilizing as much of the light emitted from LEDs as possible.

Some efforts have been made to develop small lenses for directing light emitted by small LED packages, and utilizing lenses intended to redirect some amount of emitted light to form a desired illumination pattern. However, such lenses have tended to fall short of the most highly desirable performance in that some of the LED-emitted light is often lost.

Typically, some of the LED-emitted light rays are oriented at angles that previously would result in illumination of undesirable areas and thus produce less than fully efficient illumination patterns. Prior lenses would typically be arranged to either prevent these undesirable light rays from exiting the lens or to block these rays immediately upon their exiting the lens. Even though these steps were deemed necessary to achieve desired illumination patterns and to prevent so-called lighting "trespass," they resulted in lost light and decreased efficiency of LED illuminators. It would be highly desirable to improve efficiency of output of light emitted by LEDs.

Typical LED illuminators emit light at a wide range of angles such that light rays reach the same area of the output surface of a lens at different angles. This has made it very difficult to control refraction of such light. As a result, only a portion of light being refracted is refracted in a desired direction, while the reminded exited the lens with very little control. It would be desirable to provide improved control of the direction of light exiting a lens.

Trespass lighting can be evaluated by more than just the amount of light emitted toward an undesirable direction; also to be considered is how far from the desired direction such light is directed. It would be highly beneficial to provide a lighting apparatus which produces a desired illumination pattern with a maximum amount of light emitted toward an area intended to be illuminated.

OBJECTS OF THE INVENTION

It is an object of the invention to provide improved LED optics (lenses) to overcome some of the problems and shortcomings of the prior art, including those referred to above.

Another object of the invention is to provide an LED lens with improved light-output efficiency.

Another object of the invention is to provide an LED lens with improved control of the direction of light exiting the optic.

How these and other objects are accomplished will become apparent from the following descriptions and the drawings.

SUMMARY OF THE INVENTION

This invention is a lens with improved efficiency of output of light from a light emitter which has an emitter axis and defines an emitter plane. It is preferred that the light emitter is an LED package which is free of a surrounding reflective surface. Such improved efficiency of light output from a light emitter is achieved with the inventive lens positioned over the emitter and specifically designed for controlled refraction of light at a lens output surface. The inventive lens provides useful output of almost all of the emitted light, including light emitted at angles which previously resulted in the loss of such light.

The inventive lens includes an emitter-adjacent base end forming an opening to an inner cavity surrounding the emitter. An inner-cavity surface preferably includes an axis-adjacent first inner region, a second inner region spaced from the first inner region, and a middle inner region which joins the first and second regions. The axis-adjacent first inner region is configured for refracting emitter light rays away from the axis. The second inner region is configured for refracting emitter light rays toward the axis. The middle inner region is substantially cross-sectionally asymptotical to the axis-adjacent and base-adjacent regions. It is preferred that the middle inner region is positioned with respect to the emitter to refract light away from the axis by progressively lesser amounts at positions progressively closer to the base-adjacent inner region.

The lens further has an outer surface which includes output regions each configured for refracting the light from a corresponding one of the inner regions such that at the outer surface light from each inner region is refracted substantially without overlapping light rays from the other inner regions.

In preferred embodiments, the outer surface output regions include an axis-adjacent first output region, a second output region spaced from the first output region, and a middle output region joining the first and second output regions. The axis-adjacent first output region is configured for receiving emitter light rays from the axis-adjacent first inner region and preferably refracting them away from the axis. The second output region is configured for receiving emitter light rays from the second inner region and preferably refracting them substantially away from the axis. The middle output region is configured for receiving emitter light rays from the middle inner region and preferably refracting them substantially away from the axis.

It is preferred that the outer surface further includes a base-adjacent outer-surface region which extends from the second output region and is substantially free from receiving any emitter light. The base-adjacent outer-surface region is preferably substantially orthogonal to the emitter plane.

In some preferred embodiments, the second inner region terminates before reaching the emitter plane. In such embodiments, the inner-cavity surface further preferably includes a base-adjacent inner region extending from the second inner region. The base-adjacent inner region is preferably substantially orthogonal to the emitter plane. The light rays emitted between the second inner region and the emitter plane preferably pass through the base-adjacent inner region substantially free of refraction.

In the embodiments just described, the lens preferably further includes a peripheral inner surface receiving light from the base-adjacent inner region. It is highly preferred that the peripheral inner surface is configured for total internal reflection (TIR) of such light toward the emitter axis. The peripheral inner surface is preferably formed by a peripheral cavity extending from the base end. It is preferred that the peripheral inner surface is configured for TIR of the light rays before they enter the peripheral cavity.

In preferred embodiments of the present invention, the axis-adjacent first inner region is substantially cross-sectionally concave and the second inner region is substantially cross-sectionally convex. It is further preferred that the middle inner region is substantially cross-sectionally linear. In other words, the middle inner region is preferably of substantially truncated conical shape.

The inner-cavity surface may be substantially rotationally symmetrical. The outer surface may also be substantially rotationally symmetrical such that the lens has a substantially annular cross-section made substantially parallel to the emitter plane.

Another aspect of this invention is an optical member having a plurality of lenses of the type described above. Each lens is for distribution of light from a corresponding one of spaced light emitters.

In certain embodiments, each of the lenses has at least one layer of a polymeric material extending into the lens flange of such material and is spaced from the lens flanges that surround adjacent lenses. The optical member may be a one-piece member which includes a polymeric carrier portion surrounding the lenses, overlapping with and molded onto the lens flanges across such overlapping, and extending laterally therefrom.

In some embodiments, the at least one lens layer is of a first polymeric material and the carrier is of a second polymeric material. In some of such embodiments, the first polymeric material is an acrylic and the second polymeric material is a polycarbonate.

In some other embodiments, the at least one lens layer and the carrier are of the same polymeric material.

Another aspect of this invention is an LED light fixture including a heat-sink structure having a mounting surface, a plurality of spaced LED light sources at the mounting surface, and a plurality of the lenses described above, each lens in alignment with a corresponding one of the light sources. In some embodiments, the LED light fixture includes the optical member as described above.

BRIEF DESCRIPTION OF THE DRAWINGS

FIG. 12 is a perspective view of another embodiment of an optical member according to the present invention, shown from the light-output side.

FIG. 13 is a perspective view of the optical member of FIG. 12, but showing its light-input side.

FIG. 14 is a plan view of the optical member of FIG. 12.

FIG. 15 is a side sectional view taken along section 15-15 as indicated in FIG. 14.

FIG. 16 is an end sectional view taken along section 16-16 as indicated in FIG. 14.

FIGS. 22 and 22B are another side elevation of the lens of FIG. 21 schematically showing rays representing the direction of light by the lens surfaces seen in a side-to-side plane extending through the emitter axis.

DETAILED DESCRIPTION OF PREFERRED EMBODIMENTS

Figure 1:
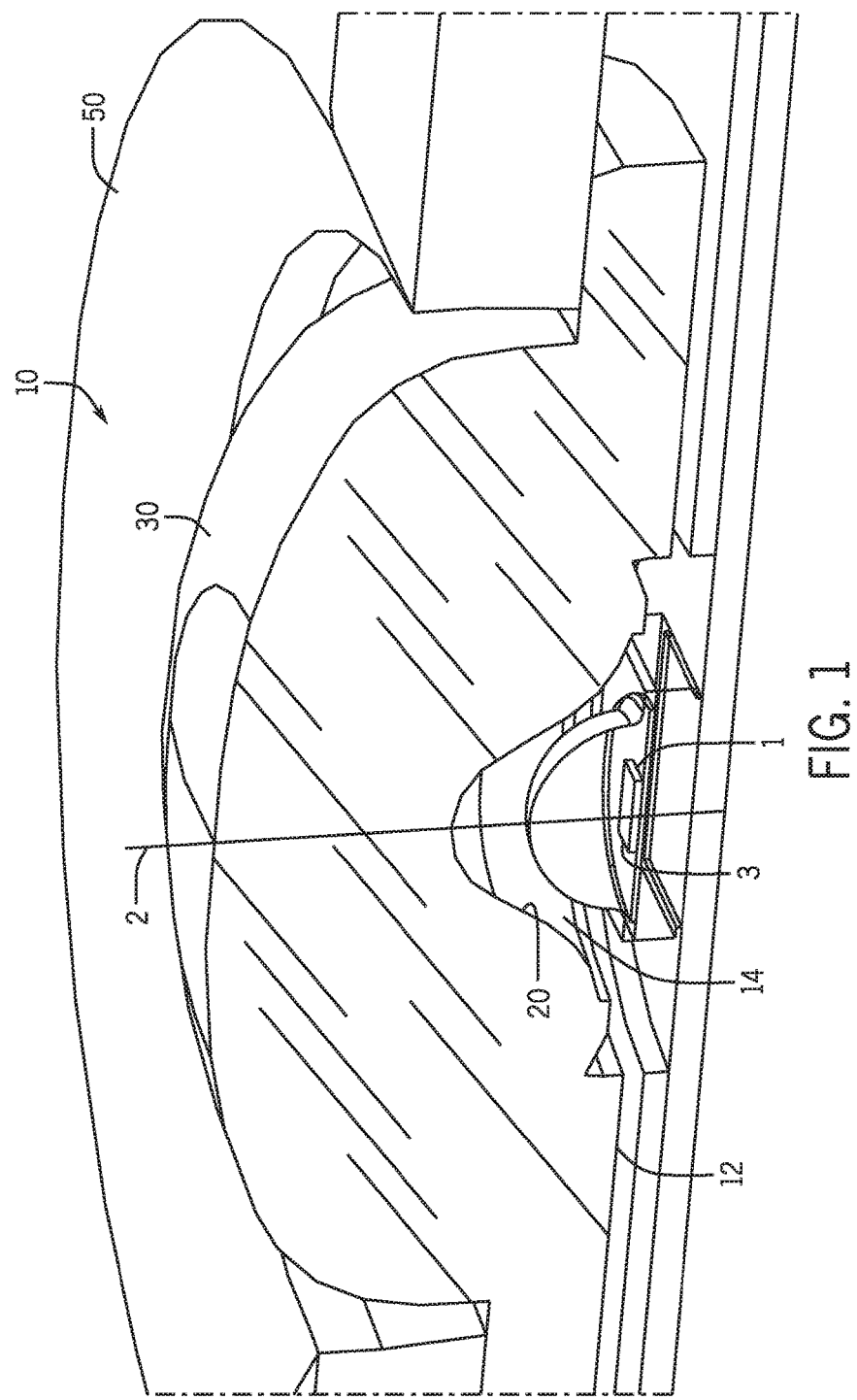
FIG. 1 is an enlarged perspective cross-sectional view of the inventive lens.

FIGS. 1-7 illustrate lens 10 which is a preferred embodiment of the invention. Lens 10 is for directing light from a light emitter 1 which has an emitter axis 2 and defines an emitter plane 3. Lens 10 includes an emitter-adjacent base end 12 forming an opening to an inner cavity 14 surrounding emitter 1. Cavity 14 defines a space between emitter 1 and an inner-cavity surface 20 such that emitter light goes through air to enter lens material at inner-cavity surface 20. Because air and the lens material, which may be acrylic or other suitable material, have different refraction indexes resulting in bending of the light at inner-cavity surface 20.

Figure 2:
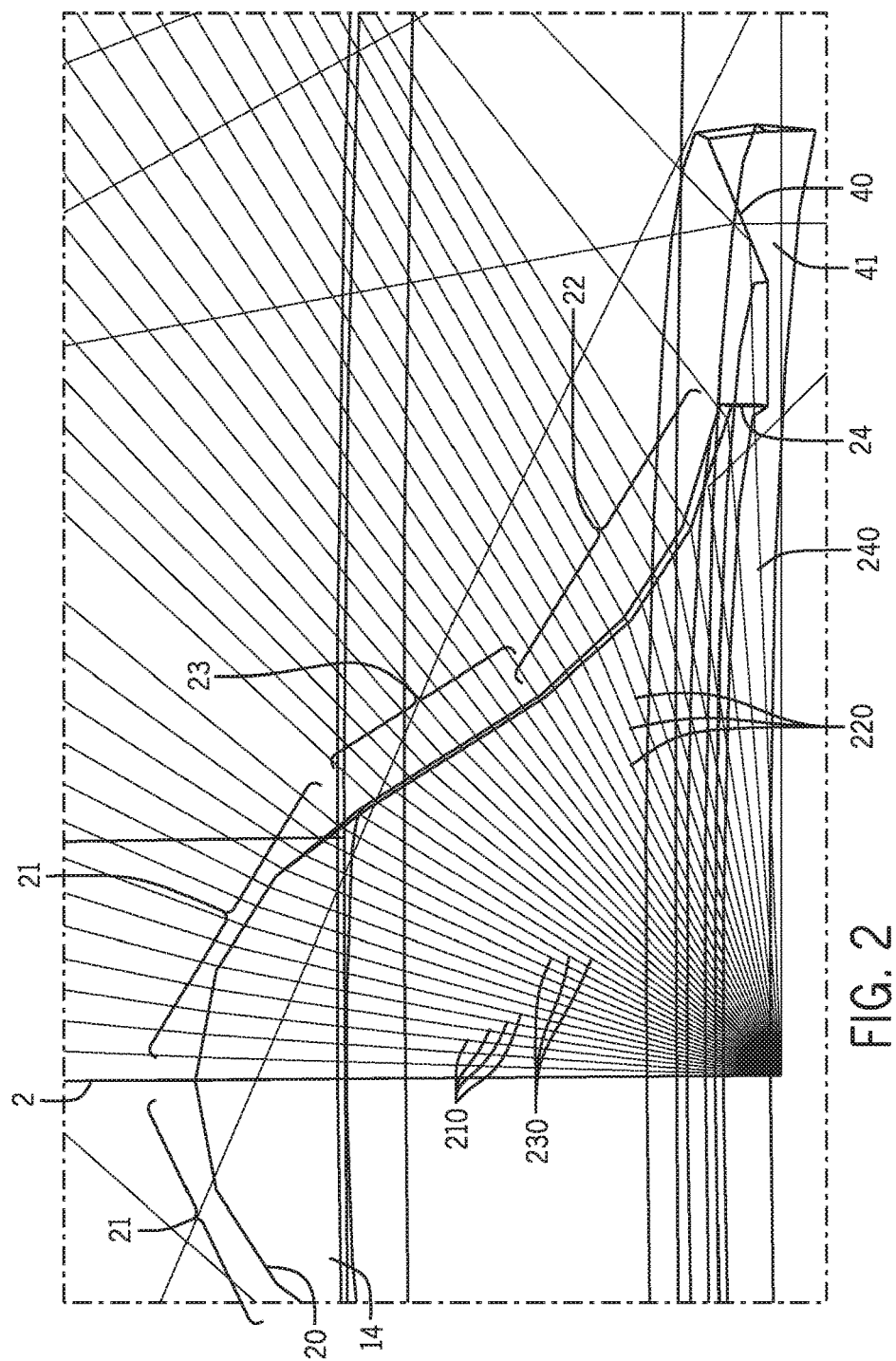
FIG. 2 is a greatly enlarged fragmentary cross-sectional side view of the lens of FIG. 1 showing refraction of the emitter light by inner-cavity surface regions and a peripheral inner cavity surface.

FIG. 2 best shows configuration of inner-cavity surface 20 which includes an axis-adjacent first inner region 21, a second inner region 22 spaced from first inner region 21, and a middle inner region 23 which joins first and second regions 21 and 22 and is substantially asymptotical to first and second inner regions 21 and 22.

Figure 3:
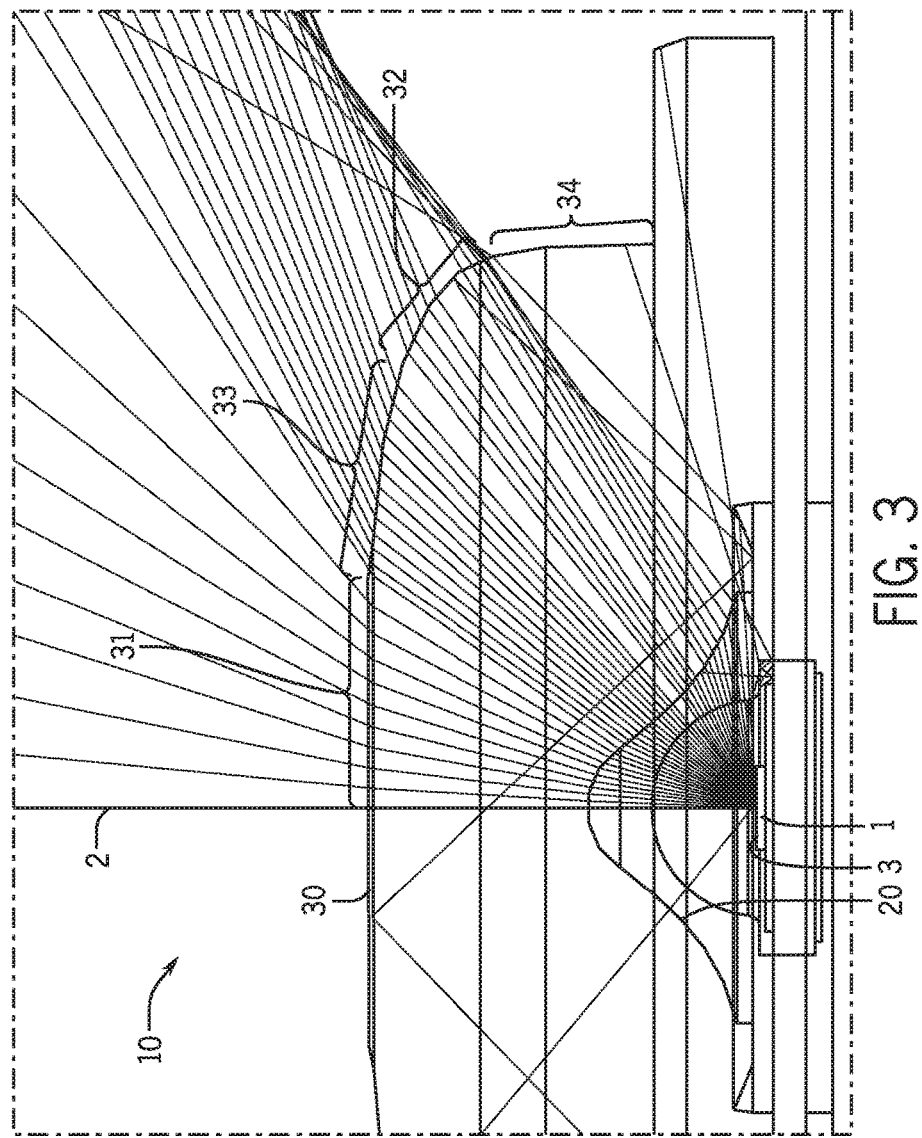
FIG. 3 is an enlarged fragmentary cross-sectional side view of the lens of FIG. 1 showing refraction of light emitted by the emitter at about the emitter axis and including a primary lens.
Figure 4:
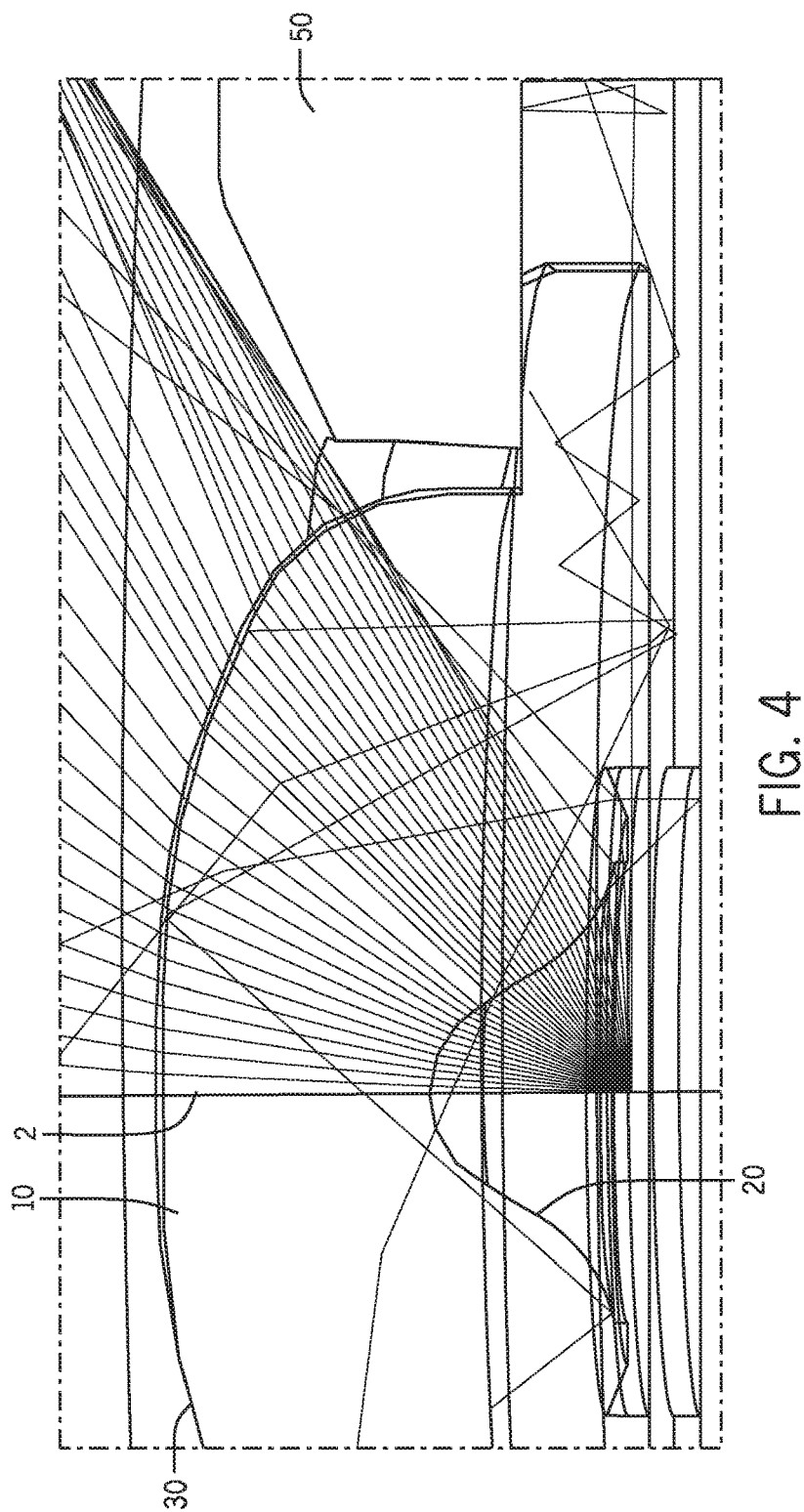
FIG. 4 is an enlarged fragmentary cross-sectional side view of the lens of FIG. 1 showing refraction of light emitted at the emitter axis.
Figure 5:
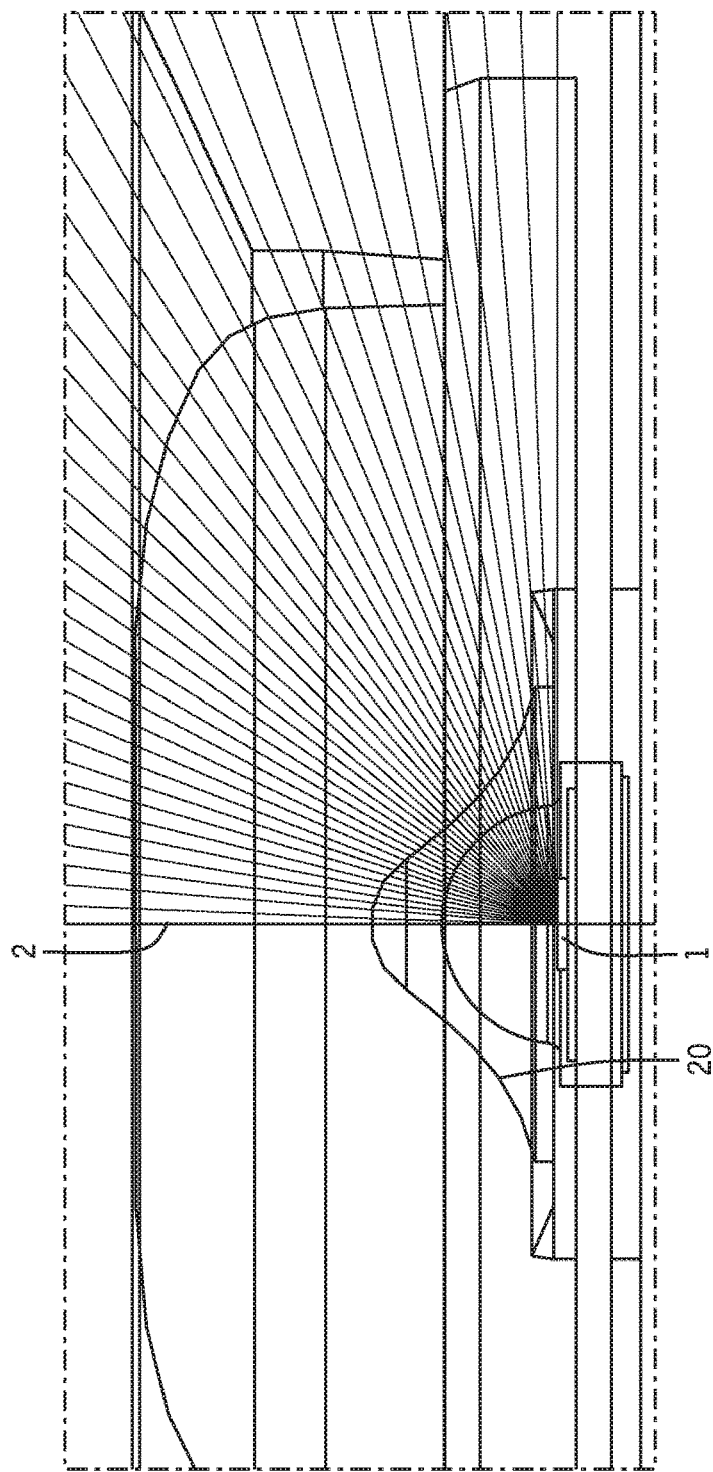
FIG. 5 is an enlarged fragmentary cross-sectional side view showing non-refracted light direction of light emitted as in FIG. 3.
Figure 6:
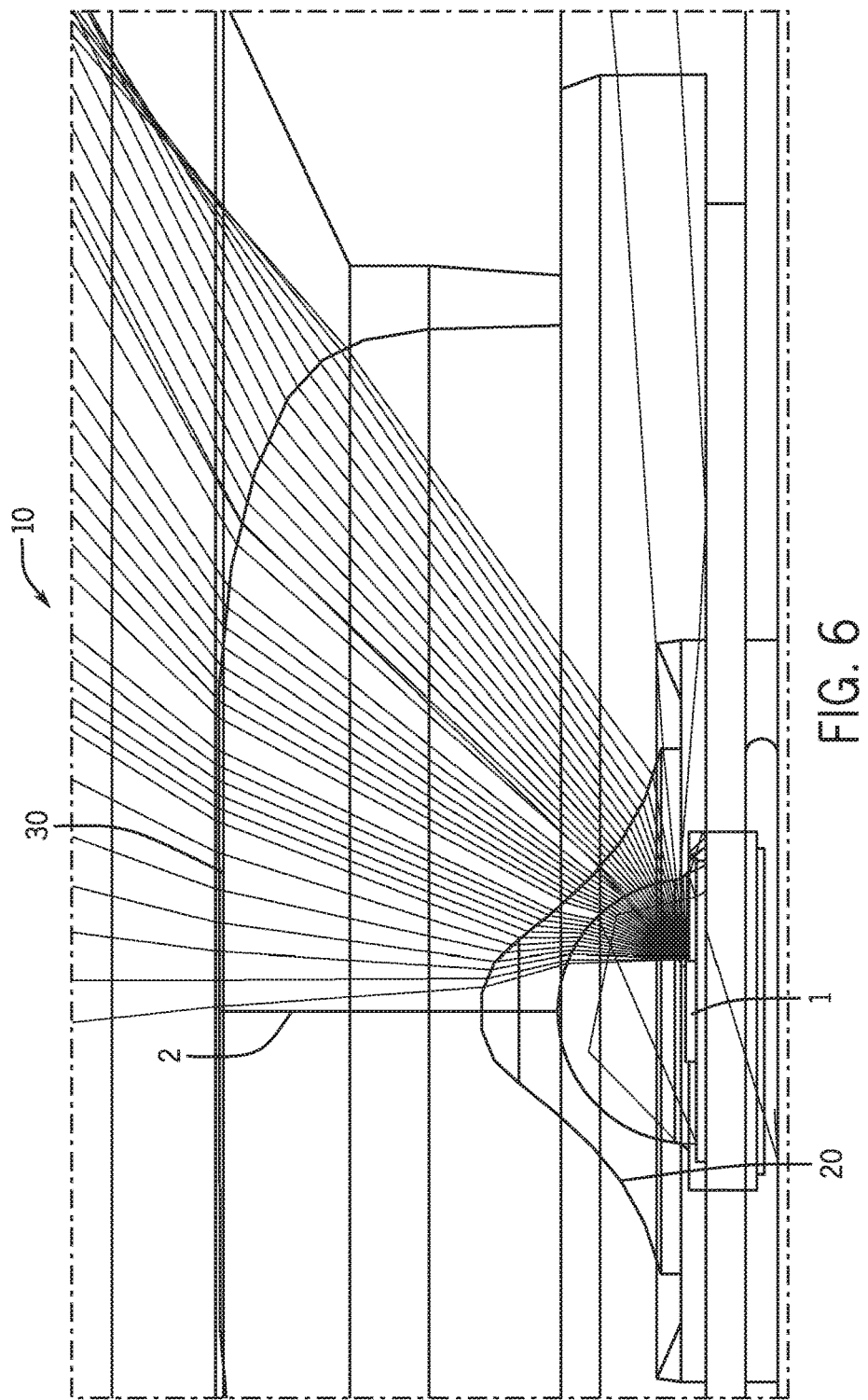
FIG. 6 is an enlarged fragmentary cross-sectional view of the lens of FIG. 1 showing refraction of light emitted from one site of the emitter axis.
Figure 7:
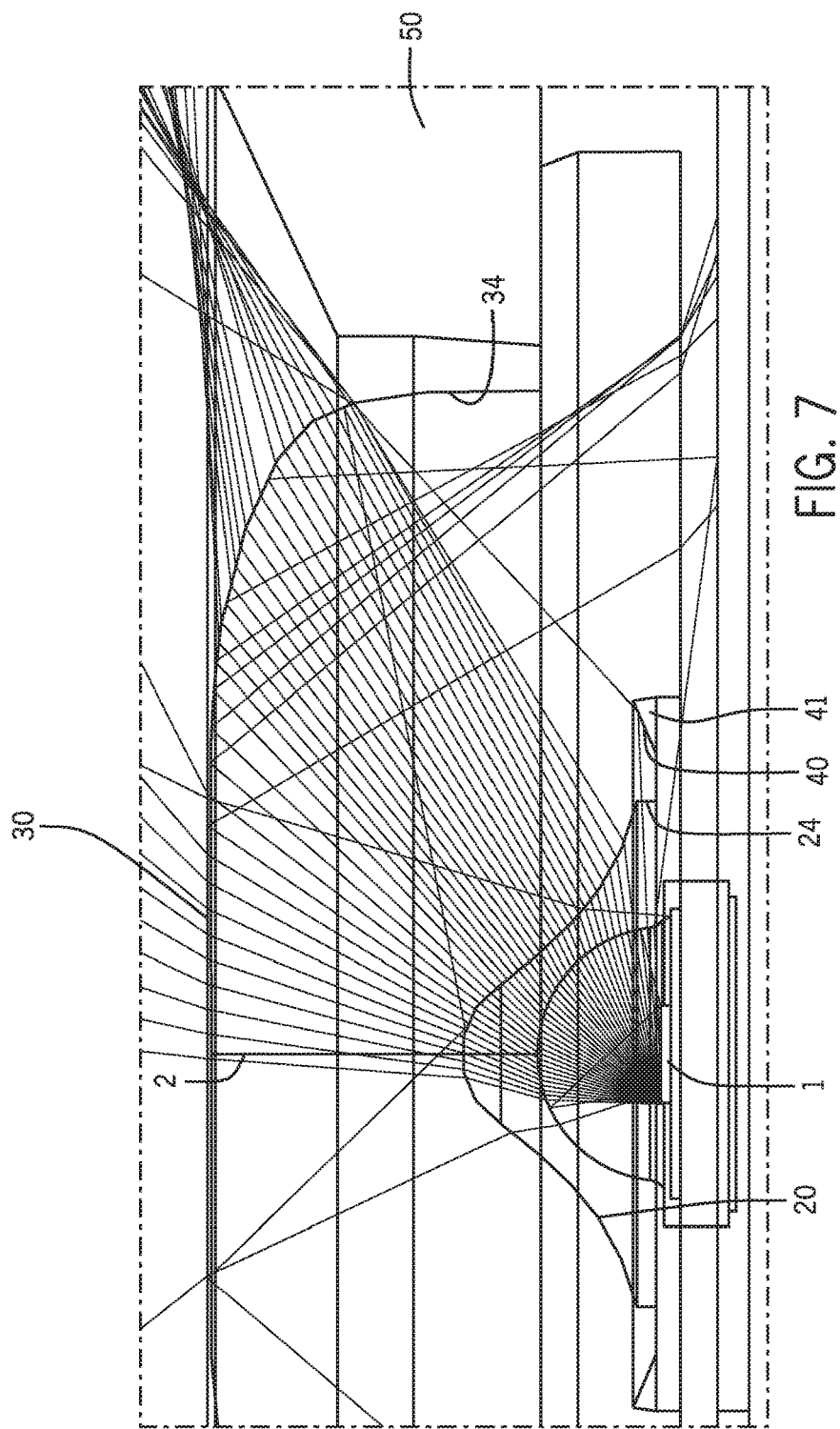
FIG. 7 is an enlarged fragmentary cross-sectional view of the lens of FIG. 1 showing refraction of light emitted from another side of the emitter axis.
Figure 8:
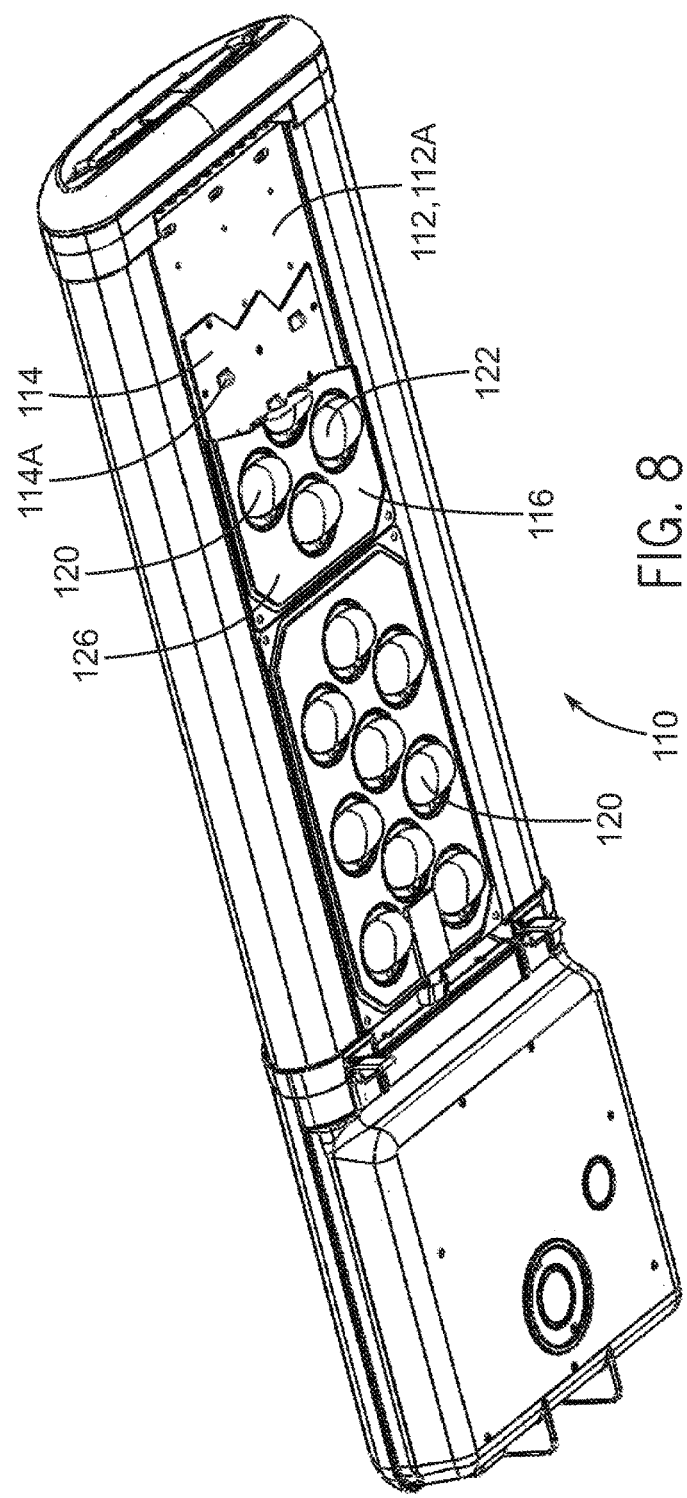
FIG. 8 is a perspective view of an LED light fixture having two optical members with a plurality of lenses in accordance with this invention.

FIGS. 1 and 3 best show that lens 10 further has an outer surface 30 which includes an axis-adjacent first output region 31, a second output region 32 spaced from axis-adjacent first output region 31, and a middle output region 33 joining first and second output regions 31 and 32. Each of output regions 31, 32 and 33 is configured for refracting the light from a corresponding one of inner regions 21, 22 and 23. Therefore, at outer surface 30 light from each inner region 21, 22 or 23 is refracted substantially without overlapping light rays from the other inner regions.

As also seen in FIG. 3, outer surface 30 further includes a base-adjacent outer-surface region 34 which extends from second output region 32 and is substantially free from receiving any emitter light. Base-adjacent outer-surface region 34 is substantially orthogonal to emitter plane 3. It should be appreciated that, since the base-adjacent outer-surface substantially does not participate in distribution of emitter light, it may have any configuration dictated by positioning and mounting of the lens or other factors such as material or space conservation.

FIG. 2 best illustrates that axis-adjacent first inner region 21 is configured for refracting emitter light rays 210 which pass through axis-adjacent first inner region 21 away from axis 2. This provides a broader distribution of the light emitted about axis and allows to enlarge the size of first output region 31 to achieve better refraction of light 210 outside lens 10. Light 210 received by the axis-adjacent first inner region 21 has the highest intensity. This is because typically the highest illumination intensity of the emitter light is concentrated about axis 2. By refracting light 210 away from axis 2, axis-adjacent inner region 21 allows for dispersion of such light 210 over a larger area. This improves uniformity of illumination intensity and substantially decreases a so-called "hot-spot" effect in a plot of illumination intensity distribution. FIG. 2 further illustrates that axis-adjacent first inner region 21 is substantially cross-sectionally concave.

As further seen in FIG. 2, second inner region 22 is configured for refracting emitter light rays toward the axis. It is seen in FIG. 2 that second inner region 22 is substantially cross-sectionally convex. Second inner region moves light 220, which mostly includes light emitted within about 30° from emitter plane 3, away from base-adjacent outer-surface region 34. As can be seen in FIG. 1, base-adjacent outer-surface region 34 is surrounded by structures 50 which may serve to secure lens 10 with respect to emitter 1 or to be a shield blocking emitter light from going in an undesirable direction. As a result, any light that would arrive at the base-adjacent region 34 would be blocked by such structures 50 and would be eventually lost. In prior lenses, because some of the light was lost, to meet goals of desired polar candela plots, the outer surface had to be designed to bend some of the axis-adjacent light to the sides to provide required illumination. By refracting light 220 toward emitter axis 2, this light is received by outer surface 30 at output region 32 which not only transmits light 220 out of lens 10 but also further refracts light 220 in a desired direction, i.e., away from emitter axis 2, as shown in FIG. 3. Therefore, since light 220 provides desired illumination at the sides of desired illumination patterns, there is no need for bending axis adjacent light 210 for such purpose.

In prior lenses the space between the emitter and inner lens surface was filled with an optical gel such that the emitter light passed therethrough without refraction and arrived to the outer surface at the same angle as emitted. In such prior lenses, the outer surface was the only vehicle for light refraction. When compared to such prior lenses, the configuration of outer surface 30 of lens 10 is unexpectedly substantially simpler then of those prior lenses. In the prior lenses, light arrived at the outer surface at substantially broad range of angles. Thus, almost all these angles had to be taken into account in forming that prior outer surface for refraction of light in a desirable direction. In lens 10, the direction of the majority of emitter light is initially substantially controlled by inner surface 20 and light from one of inner regions is received substantially by only a corresponding one output region of outer surface 30. As a result, each one output region of outer surface 30 receives light which arrives at substantially narrow sector of angles. This, coupled with improved efficiency which eliminates the need for bending axis-adjacent light for side illumination, simplifies the configuration of that output region of outer surface 30 for refraction of such light in a desired direction and, therefore, decreases a probability of an irregularity impact on the light-output direction.

It can be seen in FIG. 2 that middle inner region 23 is positioned with respect to emitter 1 to refract light away from axis 2 by progressively lesser amounts at positions progressively closer to the base-adjacent inner region. In some cases, middle region 23 may be configured and positioned to allow emitter light to pass therethrough with substantially no refraction. As best shown in FIG. 2, middle inner region 23 is substantially cross-sectionally linear. In other words, middle inner region 23 is of substantially truncated conical shape.

As best seen in FIG. 3, axis-adjacent first output region 31 is configured for receiving emitter light rays 210 from axis-adjacent first inner region 21 and further refracting them away from axis 2. Second output region 32 is configured for receiving emitter light rays 220 from second inner region 22 and refracting them substantially away from axis 22. Middle output region 33 is configured for receiving emitter light rays 230 from middle inner region 23 and refracting them substantially away from axis 2.

It should be understood that shown configuration of outer surface 30 is just an exemplary configuration. Outer surface 30 can have other configurations which would be dictated by an intended illumination pattern.

As further seen in FIGS. 1-7 second inner region 22 terminates before reaching emitter plane 3. Inner-cavity surface 20 further includes a base-adjacent inner region 24 extending from second inner region 22. Base-adjacent inner region 24 is substantially orthogonal to emitter plane 3 and is oriented for substantially non-refracted passing through of light 240 emitted between second inner region 22 and emitter plane 3.

Lens 10 further includes a peripheral inner surface 40 which receives light 240 from base-adjacent inner region 24. Peripheral inner surface 40 is configured for total internal reflection (TIR) of light 240 toward emitter axis 2. Thus, light 240 is retrieved from lens 10 for useful illumination rather than being lost. Peripheral inner surface 40 is formed by a peripheral cavity 41 extending from base end 12. As best seen in FIG. 2, peripheral inner surface 41 is configured for TIR of light rays 240 before they enter peripheral cavity 41.

FIG. 1 shows inner-cavity surface 20 substantially rotationally symmetrical. Peripheral cavity 41 and peripheral inner surface 40 are also substantially rotationally symmetrical. The embodiment illustrated in FIG. 1 further shows outer surface 30 as substantially rotationally symmetrical such that lens 10 has a substantially annular cross-section in a plane substantially parallel to emitter plane 3. Alternatively, the inner and outer surfaces can have shapes that result in substantially oval or ovoid cross-section made in a plane substantially parallel to the emitter plane. In other words, these surfaces may have symmetries other than rotational. It should be further appreciated that, depending on the intended illumination pattern, the inventive lens may be shaped without a symmetry and have asymmetrical surfaces.

FIGS. 8-17 illustrate an LED lighting fixture 110 in accordance with the present invention. LED light fixture 110 includes a heat-sink structure 112 that has a mounting surface 112A on which a circuit board 114 is mounted. Circuit board 114 has a plurality of LED light sources 114A spaced thereon. A one-piece optical member 116 is positioned over circuit board 114 and has a plurality of secondary lenses 120 thereon, each in alignment with a corresponding one of light sources 114A.

Figure 9:
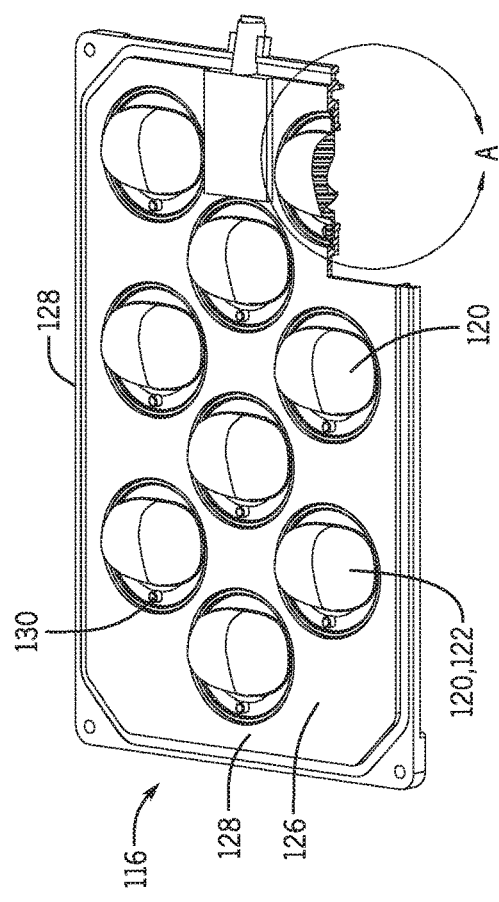
FIG. 9 is a perspective view of the optical member of the LED lighting fixture of FIG. 8.
Figure 10:
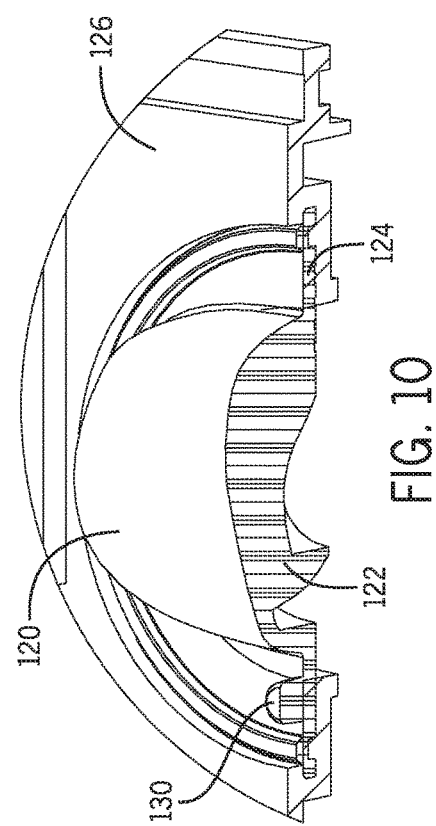
FIG. 10 is an enlarged cross-sectional perspective view of one portion of the one-piece optical member of FIG. 9, illustrating one of the lenses.

FIG. 10 best illustrates that each of lenses 120 of one-piece optical member 116 has a layer 122 of polymeric material which extends into a lens flange 124 of such material and is spaced from lens flanges 124 that surround adjacent lenses 120. FIG. 9 shows that one-piece optical member 116 also has a polymeric carrier portion 126 surrounding lenses 120. As also seen in FIG. 10, carrier portion 126 overlaps with and is molded onto to lens flanges 124 across such overlapping, and carrier portion 126 extends laterally therefrom to a peripheral edge portion 128.

The polymeric material of lens 120, i.e., the material of layer 122 and flange 124, is an acrylic, while the polymeric material of carrier portion 126 is a polycarbonate. A wide variety of optical-grade acrylics can be used, and are available from various sources, including: Mitsubishi Rayon America, Inc.; Arkema Group; and Evonik Cyro LLC. Likewise, a wide variety of polycarbonate materials can be used, and are available from various sources, such as Bayer and Sabic.

Figure 11:
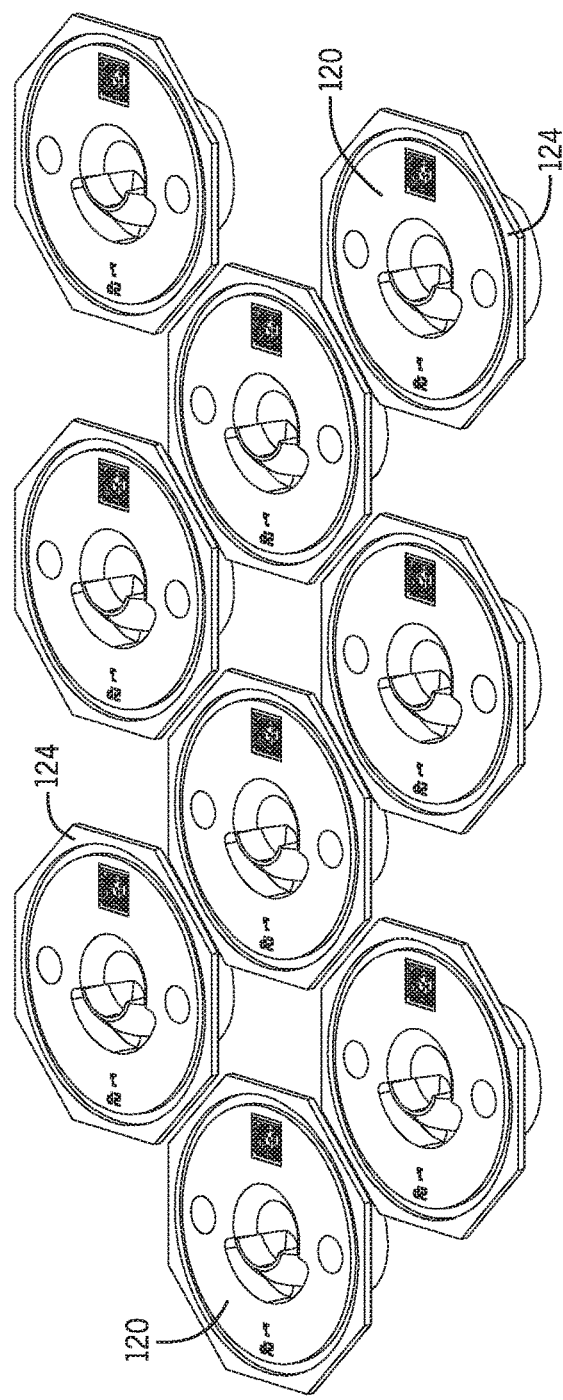
FIG. 11 is a perspective view illustrating the plurality of the lenses.

FIG. 11 illustrates the positioning of secondary lenses 120 as placed in injection-molding apparatus (not shown). After such placement, carrier portion 126 is injection molded onto lens flanges 124 to form one-piece optical member 116. As already indicated, carrier portion 126 surrounds lenses 120 and overlaps and is molded onto to lens flanges 124.

FIGS. 12-17 illustrate aspects of an alternative one-piece optical member 116A which has three lenses 120 and a carrier portion 126A. The only significant difference between one-piece optical members 116 and 116A is the number of lenses.

Figure 17:
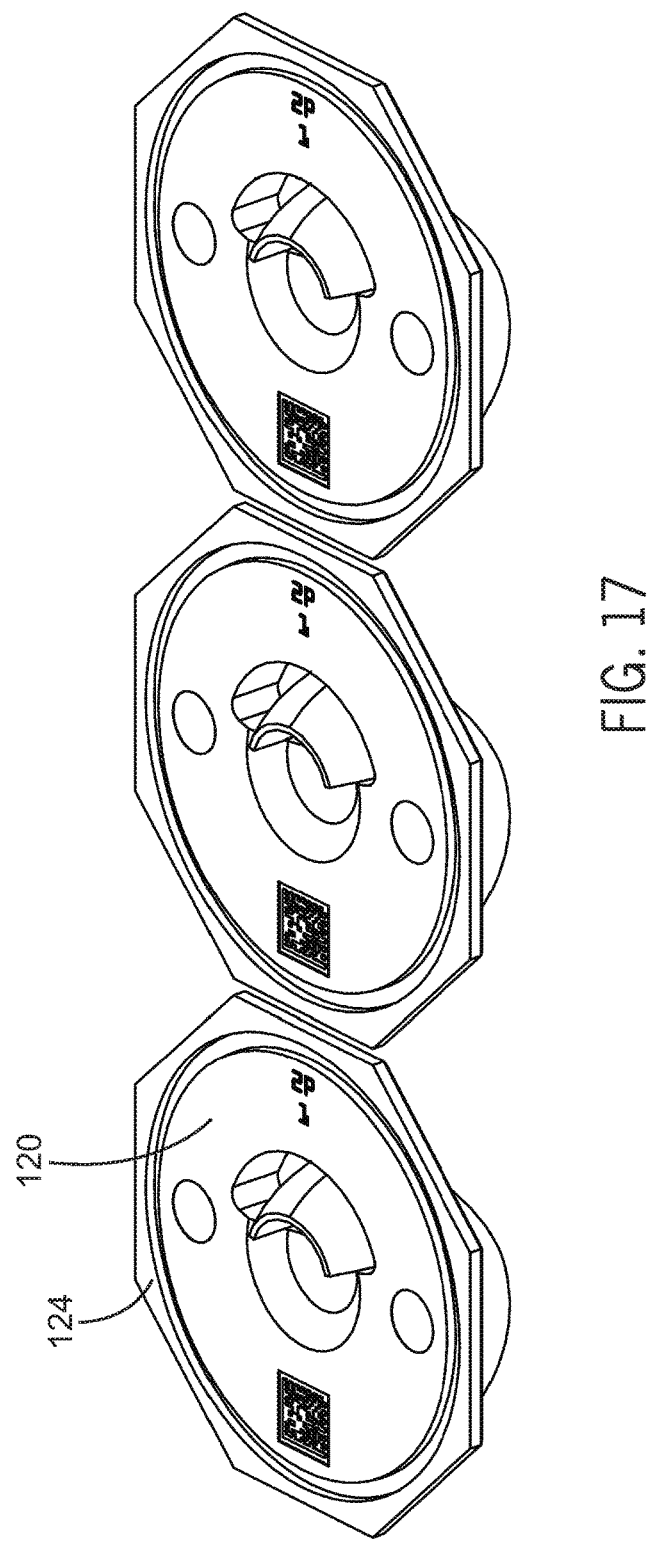
FIG. 17 is an enlarged perspective view of the lenses arranged as in the optical member of FIG. 12 showing its light-input side.
Figure 18:
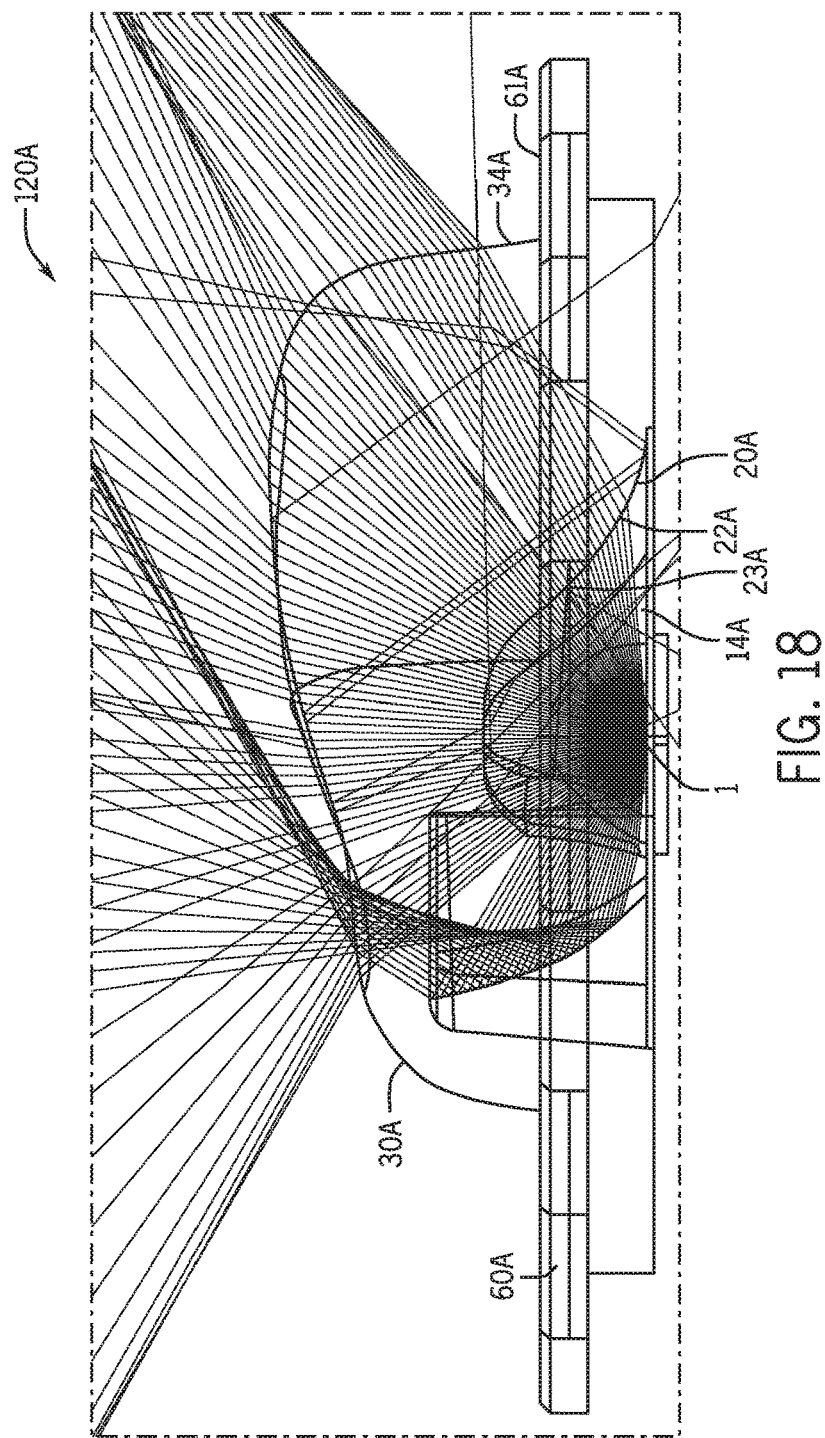
FIG. 18 is a side elevation of yet another embodiment of a lens according to the present invention, schematically shown with rays representing the direction of light by the lens surfaces seen in a front-to-back plane extending through the emitter axis.
Figure 19:
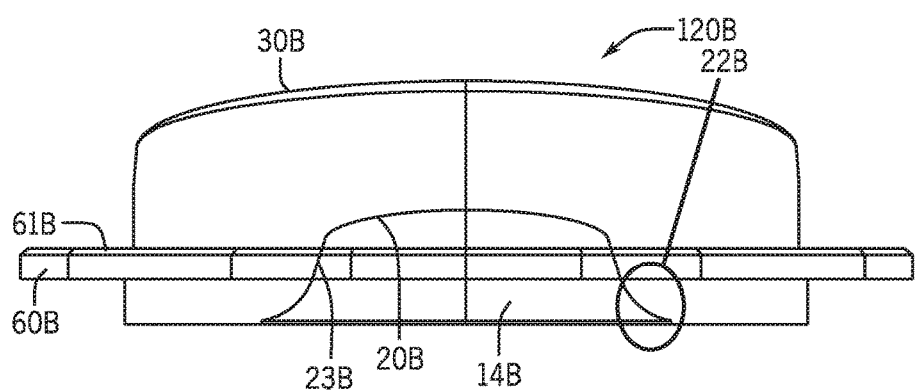
FIG. 19 is a side elevation of still another embodiment of the lens according to the present invention.
Figure 20:
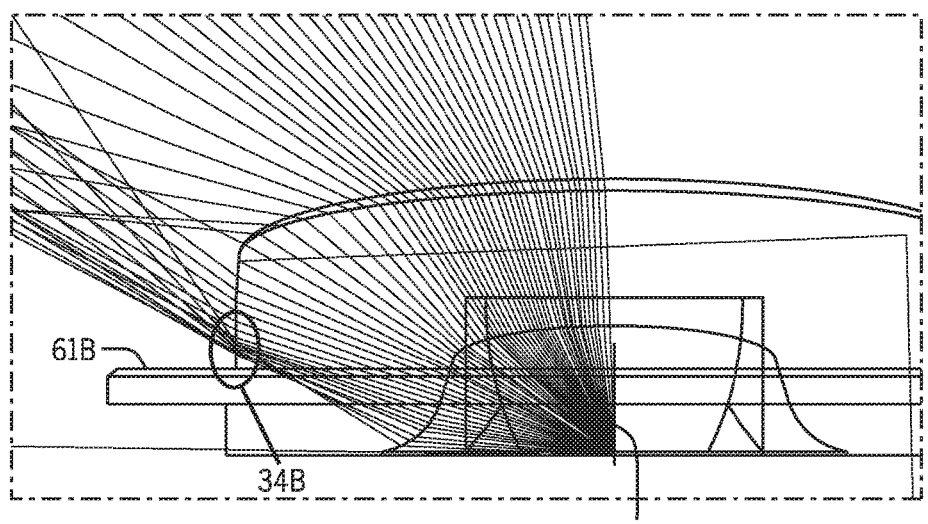
FIG. 20 is another side elevation of the lens of FIG. 19 schematically showing rays representing the direction of light by the lens surfaces seen in a side-to-side plane extending through the emitter axis.
Figure 21:
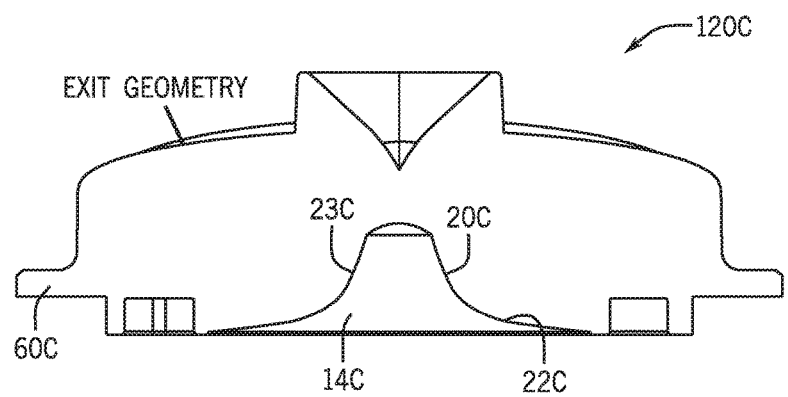
FIG. 21 is a side elevation of yet another embodiment of the lens according to the present invention.
Figure 22A:
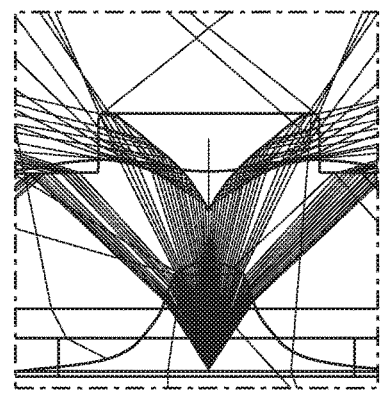
FIG. 22A is a fragment of the side elevation of FIG. 22 schematically showing rays representing the direction of axis-adjacent light by the lens surfaces.
Figure 22:
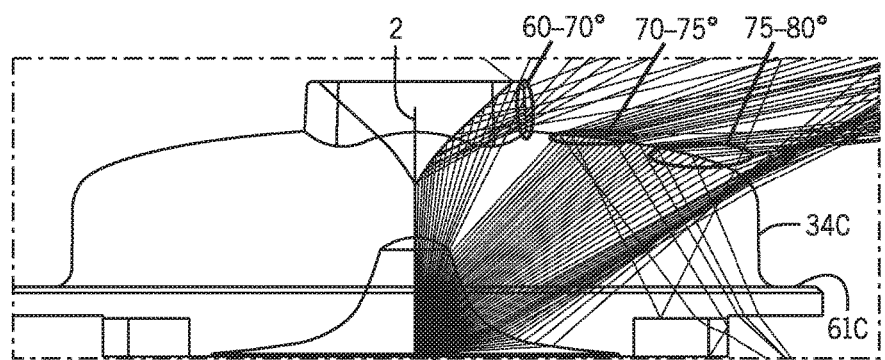

FIG. 17, like FIG. 11, illustrates the positioning of secondary lenses 120 as placed in injection-molding apparatus. Accurate placement into the injection-molding apparatus is facilitated by indexing features in the form of posts 130 (see FIGS. 12, 14 and 15) which extend from lens flange 124 and mate with corresponding recesses in the mold. (FIGS. 9 and 10 also show such indexing feature.)

FIGS. 18-24 shows lenses 120A, 120B, 120C and 120D which are exemplary embodiments of the lens according to the present invention. Each of these lenses has inner surface 20A-D which defines inner cavity 14A-D and includes a substantially cross-sectionally convex inner region 22A-D along an open end of inner cavity 14A-D. As seen in each of FIGS. 18, 20 22 and 24, convex region 22A-D is configured for refracting emitter light rays toward emitter axis 2. FIGS. 18-24 also show a lens flange 60A-D surrounding lens 120A-D and having an outer flange surface 61A-D extending radially outwardly from lens outer surface 30A-D at positions axially spaced from light emitter 1. It is seen in FIGS. 18, 20, 22 and 24 that convex inner region 22A-D is configured to refract emitter light to the outer surface such that outer flange surface 61A-D is substantially free from receiving any emitter light.

FIGS. 18-24 also show that inner surface 20A-D has a substantially cross-sectionally linear inner region 23A-D which joins substantially cross-sectionally convex inner region 22A-D and extends therefrom toward emitter axis 1.

Figure 23:
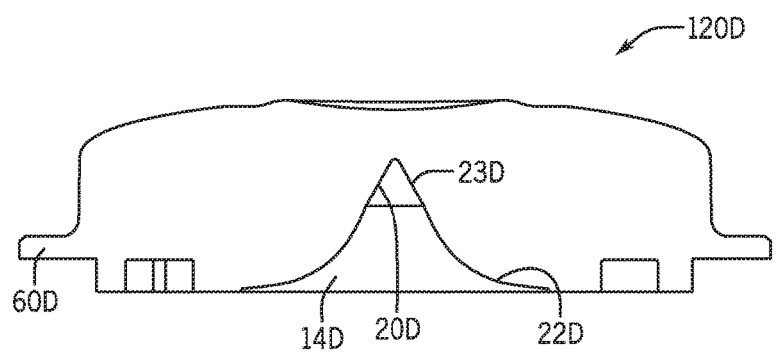
FIG. 23 is a side elevation of another embodiment of the lens according to the present invention.
Figure 24:
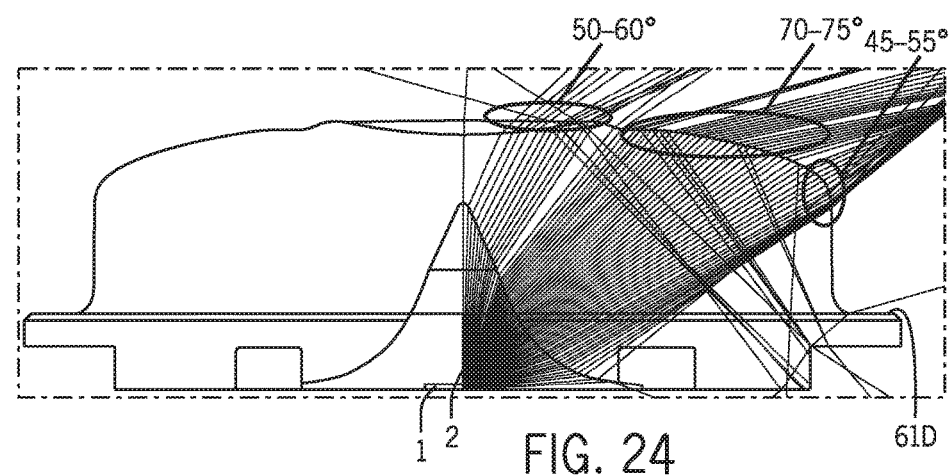
FIGS. 24 and 25 are another side elevation of the lens of FIG. 23 schematically showing rays representing the direction of light by the lens surfaces seen in a side-to-side plane extending through the emitter axis.
Figure 25:
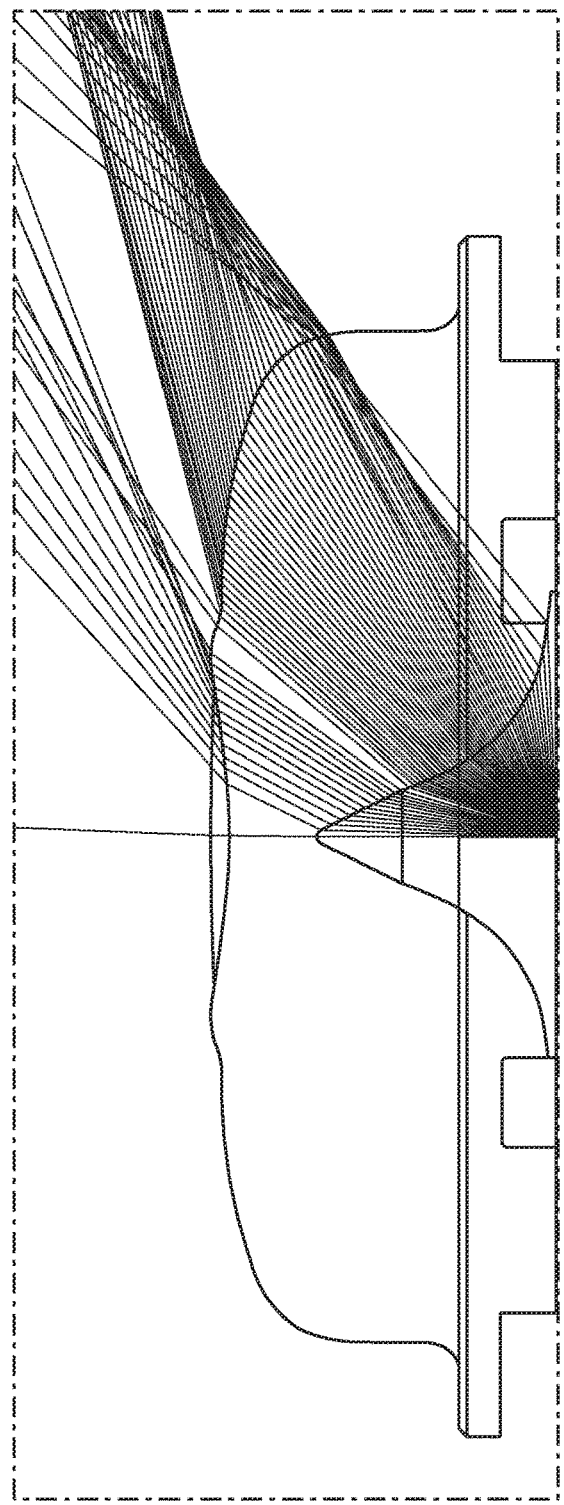
Figure 26:
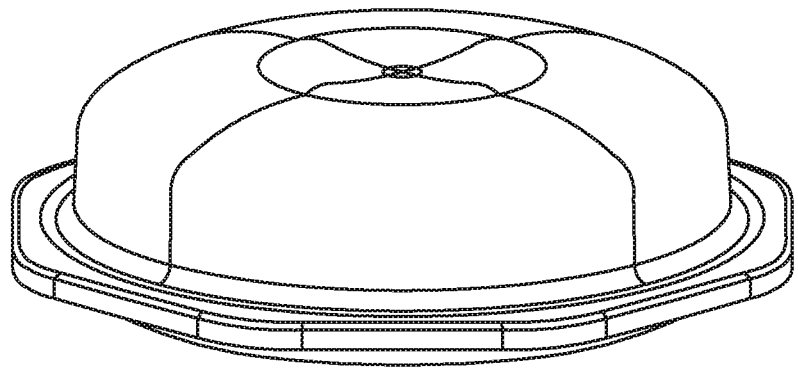
FIG. 26 is a perspective view from light output side of the lens of FIG. 23 illustrating an outer-surface feature receiving axial light from the inner surface and further directing such light away from the axis to facilitate diffusion of high-intensity axial light.
Figure 27:
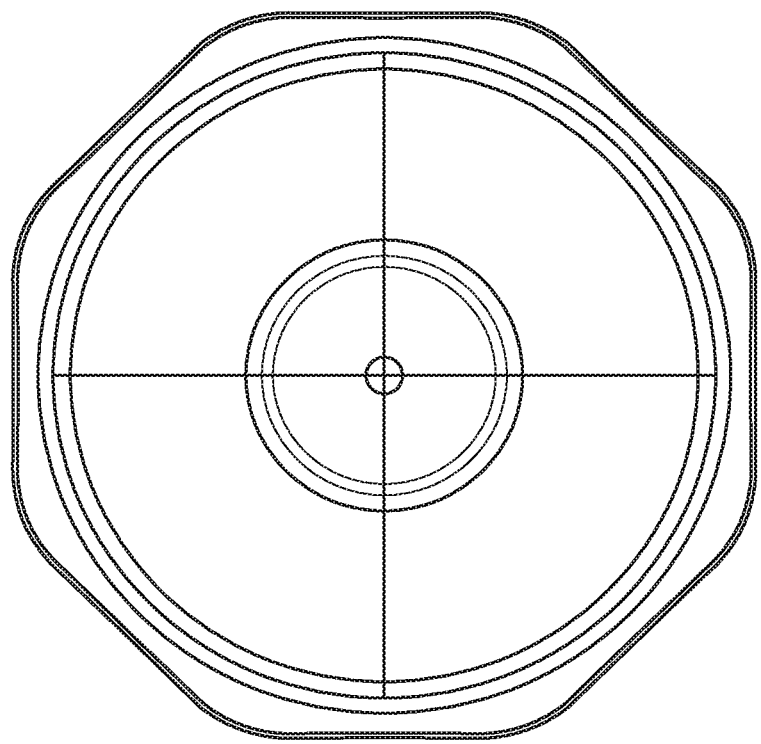
FIG. 27 is a plan view of the lens of FIG. 23 showing its light-output side.

FIGS. 23 and 24 show that, in lens 120D, substantially cross-sectionally linear inner region 23D forms a cone-shaped inner surface portion at the closed end of inner cavity 14D. It is further seen in FIG. 24 that such cone-shaped inner surface portion serves to refract axis-adjacent emitter light away from the axis.

While the principles of the invention have been shown and described in connection with specific embodiments, it is to be understood that such embodiments are by way of example and are not limiting.

The invention claimed is:

1. A lens for distribution of light from a light emitter having an emitter axis, comprising:
   a refracting inner surface defining an inner cavity with an open end, the inner surface comprising an axially-adjacent inner-surface portion of a substantially conical shape formed by a substantially cross-sectionally linear inner region extending outwardly away from the emitter axis toward the open end of the inner cavity; and
   an outer surface receiving light from the inner surface and including an axial output region configured for receiving light from the axially-adjacent inner-surface portion and refracting it away from the emitter axis.

2. The lens of claim 1 wherein the open end into the inner cavity is formed by an open-end inner-surface portion shaped differently than the axially-adjacent inner-surface portion.

3. The lens of claim 2 wherein the open-end inner-surface portion is substantially cross-sectionally convex for refracting emitter light rays toward the emitter axis.

4. The lens of claim 3 wherein the open-end inner-surface portion is a substantial portion of the inner surface and adjoins the axially-adjacent inner-surface portion which is another substantial portion of the inner surface.

5. The lens of claim 1 wherein the axial output region of the outer surface is substantially concave and is surrounded by a substantially convex region of the outer surface.

6. The lens of claim 5 wherein the convex output region of the outer surface transitions away from the emitter axis toward a base-adjacent outer-surface region being substantially free from receiving any emitter light.

7. The lens of claim 6 wherein the base-adjacent outer-surface region is substantially parallel to the emitter axis.

8. The lens of claim 5 wherein:
the outer surface is substantially rotationally symmetrical; and
the axial output region is substantially circular in planes substantially orthogonal to the emitter axis.

9. The lens of claim 8 wherein the inner-cavity surface is substantially rotationally symmetrical.

10. The lens of claim 1 wherein the inner-cavity surface is substantially rotationally symmetrical.

11. An LED light fixture comprising a mounting structure supporting a plurality of spaced LED light sources with a plurality of lenses each in alignment with a corresponding one of the light sources, each of the lenses having an outer surface receiving light from a refracting inner surface which defines an inner cavity with an open end, the inner surface comprising an axially-adjacent inner-surface portion of a substantially conical shape formed by a substantially cross-sectionally linear inner region extending outwardly away from a corresponding emitter axis toward the open end of the inner cavity, the outer surface including an axial output region configured for receiving light from the axially-adjacent inner-surface portion and refracting it away from the axis.

12. The light fixture of claim 11 wherein the open end into the inner cavity is formed by an open-end inner-surface portion shaped differently than the axially-adjacent inner-surface portion.

13. The light fixture of claim 12 wherein the open-end inner-surface portion is substantially cross-sectionally convex for refracting emitter light rays toward the emitter axis.

14. The light fixture of claim 13 wherein the open-end inner-surface portion is a substantial portion of the inner surface and adjoins the axially-adjacent inner-surface portion which is another substantial portion of the inner surface.

15. The light fixture of claim 11 wherein the axial output region of the outer surface is substantially concave and is surrounded by a substantially convex region of the outer surface.

16. The light fixture of claim 15 wherein the convex output region of the outer surface transitions away from the emitter axis toward a base-adjacent outer-surface region being substantially free from receiving any emitter light.

17. The light fixture of claim 11 wherein:
the outer surface is substantially rotationally symmetrical; and
the axial output region is substantially circular in planes substantially orthogonal to the emitter axis.

18. The light fixture of claim 11 wherein the inner-cavity surface is substantially rotationally symmetrical.

* * * * *